(12) United States Patent
Kubacki et al.

(10) Patent No.: US 11,536,815 B2
(45) Date of Patent: Dec. 27, 2022

(54) OPTOELECTRONIC MODULES OPERABLE TO RECOGNIZE SPURIOUS REFLECTIONS AND TO COMPENSATE FOR ERRORS CAUSED BY SPURIOUS REFLECTIONS

(71) Applicant: ams Sensors Singapore Pte. Ltd., Singapore (SG)

(72) Inventors: Jens Kubacki, Affoltern am Albis (CH); Jim Lewis, Zurich (CH); Miguel Bruno Vaello Paños, Zurich (CH); Michael Lehmann, Winterthur (CH); Stephan Beer, Schaffhausen (CH); Bernhard Buettgen, Adliswil (CH); Daniel Pérez Calero, Zurich (CH); Bassam Hallal, Thalwil (CH)

(73) Assignee: AMS SENSORS SINGAPORE PTE. LTD., Singapore (SG)

( * ) Notice: Subject to any disclaimer, the term of this patent is extended or adjusted under 35 U.S.C. 154(b) by 381 days.

(21) Appl. No.: 16/895,224

(22) Filed: Jun. 8, 2020

(65) Prior Publication Data
US 2020/0319320 A1 Oct. 8, 2020

Related U.S. Application Data

(62) Division of application No. 15/124,231, filed as application No. PCT/EP2015/055358 on Mar. 13, 2015, now Pat. No. 10,705,192.
(Continued)

(51) Int. Cl.
*G01S 7/497* (2006.01)
*G01S 7/481* (2006.01)
(Continued)

(52) U.S. Cl.
CPC ............ *G01S 7/497* (2013.01); *G01J 1/0204* (2013.01); *G01J 1/0214* (2013.01);
(Continued)

(58) Field of Classification Search
None
See application file for complete search history.

(56) References Cited

U.S. PATENT DOCUMENTS

| 5,515,156 A | 5/1996 | Koshida et al. |
| 6,624,418 B1 | 9/2003 | Braunwarth et al. |
| (Continued) | | |

FOREIGN PATENT DOCUMENTS

| DE | 19704496 A1 | 3/1998 |
| DE | 19908214 A1 | 9/2000 |
| (Continued) | | |

OTHER PUBLICATIONS

International Search Report issued for the corresponding International patent application No. PCT/EP2015/055357, dated Nov. 23, 2015, 7 pages (for informational purposes only).
(Continued)

*Primary Examiner* — Eric L Bolda
(74) *Attorney, Agent, or Firm* — Viering, Jentschura & Partner MBB (57) ABSTRACT

An optoelectronic module including a light emitter to generate light to be emitted from the module, a plurality of spatially distributed light sensitive elements arranged to detect light from the emitter that is reflected by an object outside the module, and one or more dedicated spurious-reflection detection pixels.

10 Claims, 10 Drawing Sheets

Related U.S. Application Data (60) Provisional application No. 62/006,989, filed on Jun. 3, 2014, provisional application No. 62/001,858, filed on May 22, 2014, provisional application No. 61/987,045, filed on May 1, 2014, provisional application No. 61/981,235, filed on Apr. 18, 2014, provisional application No. 61/953,089, filed on Mar. 14, 2014.

(51) Int. Cl.
| | | |
|---|---|---|
| *G01S 17/894* | (2020.01) | |
| *G01S 17/36* | (2006.01) | |
| *G01J 1/42* | (2006.01) | |
| *G01J 1/02* | (2006.01) | |
| *G01J 1/04* | (2006.01) | |

(52) U.S. Cl.
CPC ........... *G01J 1/0407* (2013.01); *G01J 1/0411* (2013.01); *G01J 1/0422* (2013.01); *G01J 1/0425* (2013.01); *G01J 1/4204* (2013.01); *G01S 7/4813* (2013.01); *G01S 17/36* (2013.01); *G01S 17/894* (2020.01); *G01S 2007/4975* (2013.01)

(56) References Cited

U.S. PATENT DOCUMENTS

| | | |
|---|---|---|
| 8,604,436 B1 | 12/2013 | Patel et al. |
| 2004/0257556 A1 | 12/2004 | Samukawa et al. |
| 2005/0200840 A1 | 9/2005 | Terui |
| 2009/0020687 A1 | 1/2009 | Lehmann et al. |
| 2011/0043806 A1 | 2/2011 | Guetta et al. |
| 2011/0133941 A1 | 6/2011 | Yao et al. |
| 2012/0033045 A1 | 2/2012 | Schweizer et al. |
| 2012/0295665 A1 | 11/2012 | Pantfoerder |
| 2013/0019461 A1 | 1/2013 | Rudmann et al. |
| 2013/0050677 A1 | 2/2013 | Kwong et al. |
| 2013/0053106 A1* | 2/2013 | Kwong ................. G01J 1/0271 381/396 |
| 2013/0099101 A1 | 4/2013 | Campbell |
| 2013/0153755 A1 | 6/2013 | Pikkujamsa |
| 2013/0181862 A1 | 7/2013 | Matsumoto et al. |
| 2014/0152813 A1 | 6/2014 | Wilks et al. |
| 2015/0340351 A1 | 11/2015 | Rossi et al. |
| 2016/0025855 A1 | 1/2016 | Camarri et al. |

FOREIGN PATENT DOCUMENTS

| | | |
|---|---|---|
| EP | 1195617 A1 | 4/2002 |
| EP | 2264898 A1 | 12/2010 |
| JP | S60149984 A | 8/1985 |
| JP | 20055352171 A | 12/2005 |
| TW | 201202729 A | 1/2012 |
| TW | 201215873 A | 4/2012 |
| TW | 201312144 A | 3/2013 |

OTHER PUBLICATIONS

Notice of Preliminary Rejection issued from the Korean Patent Office for related Application No. 1020167028390 dated Oct. 12, 2021 (6 Pages including English Translation).
Translation of German Patent Document DE19908214A1 published Sep. 21, 2000.
European Patent Office International Search Report for Application No. PCT/EP2015/055358 dated Aug. 10, 2015.
Notice of Preliminary Rejection issued from the Korean Patent Office for relate Application No. 10-2016-7028390 dated May 24, 2021 (10 Pages including English Translation).

* cited by examiner

OPTOELECTRONIC MODULES OPERABLE TO RECOGNIZE SPURIOUS REFLECTIONS AND TO COMPENSATE FOR ERRORS CAUSED BY SPURIOUS REFLECTIONS

CROSS-REFERENCE TO RELATED APPLICATIONS

This application is a Divisional Application of the U.S. patent application Ser. No. 15/124,231, filed Sep. 7, 2016, which is U.S. National Stage Entry, under 35 U.S.C. § 371, of International Application No. PCT/EP2015/055358, filed Mar. 13, 2015, which claims the benefit of priority of the following U.S. Provisional Patent applications: Ser. No. 61/953,089 filed on Mar. 14, 2014; Ser. No. 61/981,235 filed on Apr. 18, 2014; Ser. No. 61/987,045, filed on May 1, 2014; Ser. No. 62/001,858, filed on May 22, 2014; and Ser. No. 62/006,989, filed on Jun. 3, 2014. The contents of the prior applications are incorporated herein by reference.

TECHNICAL FIELD

The present disclosure relates to modules that provide optical signal detection.

BACKGROUND

Some handheld computing devices such as smart phones can provide a variety of different optical functions such as one-dimensional (1D) or three-dimensional (3D) gesture detection, 3D imaging, time-of-flight or proximity detection, ambient light sensing, and/or front-facing two-dimensional (2D) camera imaging.

Time-of-flight (TOF) sensors, for example, can be used to detect the distance to an object. In general, TOF systems are based on the phase-measurement technique of emitted intensity-modulated light, which is reflected by a scene. The reflected light is imaged onto a sensor, and the photo-generated electrons are demodulated in the sensor. Based on the phase information, the distance to a point in the scene for each pixel is determined by processing circuitry associated with the sensor.

Additionally, TOF-based systems can provide depth and/or distance information via a pulse-measurement technique. The pulse-measurement technique employs an emitter and sensor as above; however, distance is determined by tallying the time for emitted light to reflect back onto the sensor.

In some cases, however, a smudge (e.g., a fingerprint or dirt) on the transmissive window (e.g., cover glass) of the host device can produce spurious signals, which may compromise the accuracy of the distance calculations. For example, light reflected by the cover glass and/or the smudge may be incident on the sensor. Such light typically will have a phase shift that differs from the phase shift of light reflected by the object of interest. The different phase shifts can result in an inaccurate determination of the distance to the object.

SUMMARY

The present disclosure describes optoelectronic modules operable to distinguish between signals indicative of reflections from an object of interest and signals indicative of a spurious reflection. In particular, as described below, various modules are operable to recognize spurious reflections and, in some cases, also to compensate for errors caused by spurious reflections.

For example, in one aspect, an optoelectronic module includes a light emitter to generate light to be emitted from the module, spatially distributed light sensitive elements arranged to detect light from the emitter that is reflected by an object outside the module, and one or more dedicated spurious-reflection detection pixels. In some implementations, the optoelectronic module further includes circuitry operable to use a signal from the one or more dedicated spurious-reflection detection pixels to correct for a spurious reflection. For example, in some cases, the circuitry can use a signal from the one or more dedicated spurious-reflection detection pixels to factor out a component of light reflected by a smudge present on a transmissive cover from a component of light detected by the spatially distributed light sensitive elements.

In some instances, the modules includes a reflector to direct a spurious light reflected by a smudge, a transmissive cover or other component to the dedicated spurious-reflection detection pixels. Likewise, in some cases, the module includes a light guide to direct light from a transmissive cover of a host device within which the module is disposed to the dedicated spurious-reflection detection pixels.

In accordance with another aspect, an optoelectronic module includes a light emission chamber and a light detection chamber. A first passive optical element is disposed over the light emission chamber, and a second passive optical element is disposed over the light detection chamber. A light emitter in the light emission chamber is operable to emit light toward the first passive optical element. Demodulation pixels in the light detection chamber are arranged to detect light from the emitter that is reflected by an object outside the module. Further, one or more spurious-reflection detection pixels also are in the light detection chamber. One or more light absorbing regions are provided in or on the second passive optical element and are substantially non-transparent to light at a wavelength emitted by the light emitter.

In some implementations, the light absorbing regions define a narrow straight path from a predefined area on a surface of a transmissive cover of a host device to the one or more spurious-reflection detection pixels. In some instances, the light absorbing regions are arranged to block emitter light reflected from one or more pre-defined areas of the transmissive cover from reaching the demodulation pixels. Further, in some implementations, there may be one or more light redirecting elements in or on the second passive optical element arranged to redirect at least some light impinging on the second passive optical element toward the spurious-reflection detection pixels and away from the demodulation pixels. In some cases, there may be one or more light redirecting elements in or on the first passive optical element arranged to redirect at least some emitter light impinging on the first passive optical element toward a pre-defined area.

In another aspect, an optoelectronic module includes a light emitter operable to emit light out of the module and demodulation pixels arranged to detect emitter light that is reflected by an object outside the module back into the module. The module further includes one or more combined spurious-reflection detection-reference pixels, as well as processing circuitry to correct for spurious reflections and to compensate for thermal drift based on signals from the one or more combined spurious-reflection detection-reference pixels. For example, in some implementations, the processing circuitry is configured to correct for spurious reflections based at least in part on signals from the one or more combined spurious-reflection detection-reference pixels and also is configured to compensate for thermal drift based at least in part on phase shifts in the signals from the one or more combined spurious-reflection detection-reference pixels.

Another aspect describes a method of operating an optoelectronic module comprising demodulation pixels. The method includes emitting light from the module toward an object outside the module at a first modulation frequency, detecting, in the demodulation pixels, light reflected from the object at the first modulation frequency, emitting light from the module toward the object outside the module at a second modulation frequency and detecting, in the demodulation pixels, light reflected from the object at the second modulation frequency. The method further includes identifying a component in the signals detected by the demodulation pixels, wherein the component is caused by a reflection from a smudge on a cover glass, or a reflection from the cover glass, from a filter, or from another optical or non-optical element in the optoelectronic module or host device in which the optoelectronic module is disposed. The method includes subtracting out the component so as to determine a phase shift and amplitude resulting from light reflected by the object.

Other aspects, features and advantages will be readily apparent from the following detailed description, the accompanying drawings, and the claims.

DETAILED DESCRIPTION

Figure 1:
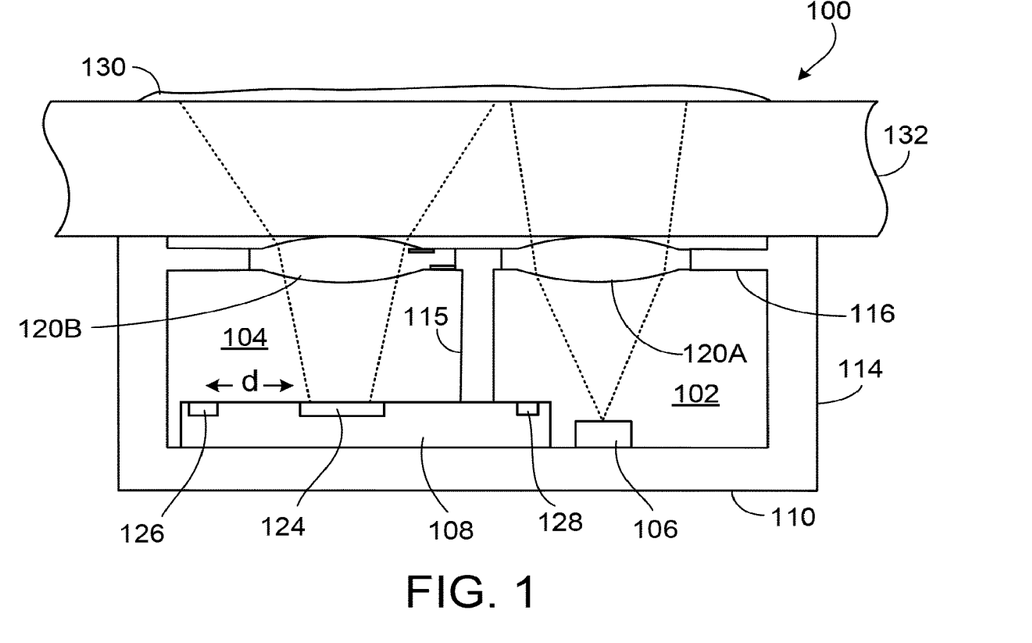
FIG. 1 illustrates an example of a TOF sensor module.

FIG. 1 illustrates an example of an optoelectronic module 100 that includes a light emission channel 102 and a light detection channel 104. A light emitter 106 (i.e., an illumination source) and a TOF sensor 108 are mounted on a first side of a printed circuit board (PCB) 110, which forms the bottom side of the module housing. The light emitter 106 can be operable to generate coherent, directional, spectrally defined light emission with minimal divergence relative to the emission axis (e.g., in the range of 10 to 20 degrees). Examples of the light emitter 106 are a laser diode or a vertical cavity surface emitting laser (VCSEL).

A spacer 114 is attached to the first side of the PCB 110 and separates the PCB 110 from an optics member 116. The spacer 114 can be composed of a material (e.g., epoxy resin) and have a thickness such that it is substantially non-transparent to wavelengths of light detectable by the TOF sensor 108. An interior wall 115 of the spacer 114 provides optical isolation between the module's two chambers (i.e., the light emission chamber (channel) 102 and the light detection chamber (channel) 104).

The optics member 116 includes a respective passive optical element (e.g., a lens) 120A, 120B for each channel 102, 104. Light from the emitter 106 is directed out of the module 100 and, if reflected by an object back toward the module's detection channel 104, can be sensed by the TOF sensor 108.

The TOF sensor 108 includes an array of spatially distributed light sensitive elements (e.g., pixels), as well as logic and other electronics to read and process the pixel signals. The pixels can be implemented, for example, in a single integrated semiconductor chip (e.g., a CCD or CMOS sensor). The emitter 106 and the TOF sensor 108 can be connected electrically to the PCB 110, for example, by conductive pads or wire bonds. The PCB 110, in turn, can be connected electrically to other components within a host device (e.g., a smart phone). The TOF sensor 108 is operable to resolve distance based on the known speed of light by measuring the time-of-flight of a light signal between the sensor and the subject for each point of an object. The circuitry in the TOF sensor 108 can use signals from the pixels to calculate, for example, the time the light has taken to travel from the emitter to an object of interest and back to the focal plane array.

The TOF sensor 108 can be implemented, for example, as an integrated sensor chip. As shown in FIG. 1, the TOF sensor 108 includes active demodulation detection pixels 124, one or more dedicated "spurious reflection detection" pixels 126 and one or more reference pixels 128. Although the number and arrangement of the demodulation detection pixels 124 can vary depending on the implementation, in some implementations, the demodulation detection pixels are in a 3×3 array. In some cases, the spurious-reflection detection pixels may be referred to as smudge detection pixels. Each spurious-reflection detection pixel 126 can be implemented, for example, as a CCD pixel or a photodiode. The demodulation detection pixels 124 provide the primary signals for determining the proximity of an object outside the module. The demodulation detection pixels 124 preferably are centered below the light detection channel lens 120B. The center optical emission axis of the emitter 106 preferably is aligned with the emitter channel lens 120A. Signals sensed by the spurious-reflection detection pixel(s) 126 can be used to correct for spurious reflections such as from a smudge (i.e., a blurred or smeared mark such as a fingerprint or dirt) 130 on the transmissive cover (e.g., a cover glass) 132 of a host device (e.g., a smart phone or other handheld computing device). In some implementations, signals sensed by the spurious-reflection detection pixel(s) 126 can be used to correct for spurious reflections resulting from other direct reflections such as from the cover glass, from a filter, or from other optical/non-optical components in the optoelectronic module or host device. If such corrections are not performed, the TOF sensor may produce a spurious output signal, which can compromise the accuracy of the proximity data collected. A small amount of light from the emitter 106 can be reflected, for example, by the lens 120A back toward the reference pixel(s) 128. Signals from the reference pixel(s) 128 can be used to compensate for thermal drift and/or to provide a zero distance measurement.

The sensor's processing circuitry can be implemented, for example, as one or more integrated circuits in one or more semiconductor chips with appropriate digital logic and/or other hardware components (e.g., read-out registers; amplifiers; analog-to-digital converters; clock drivers; timing logic; signal processing circuitry; and/or a microprocessor). The processing circuitry may reside in the same semiconductor chip as the sensor 108 or in one or more other semiconductor chips.

In the example of FIG. 1, an interior wall 115 of the spacer 114 provides optical isolation between the module's two chambers (i.e., the light emission channel 102 and the light detection channel 104). The reference pixel(s) 128 are located in the emitter chamber 102, whereas the demodulation detection pixels 124 and the dedicated spurious-reflection detection pixel(s) 126 are located in the detection chamber 104. The interior wall 115 prevents emitter light, which is reflected, for example, back into the emission chamber 102 by the lens 120A, from impinging on the demodulation detection pixels 124.

In some of the examples described here, it is assumed that spurious reflections may be caused by a smudge on the cover glass of the host device. However, the modules and techniques described below also can be applicable to spurious reflections resulting from other direct reflections such as from the cover glass, from a filter, or from other optical/non-optical components in the optoelectronic module or host device.

Preferably, the spurious-reflection detection pixel(s) 126 should be positioned relative to the demodulation detection pixels 124 such that, in the absence of a smudge on cover 132 of the host device, the spurious-reflection detection pixel 126 senses, at most, a signal representing only a relatively low optical intensity of light reflected by an object in a scene outside the module 100. In contrast, when a smudge 130 is present on the surface of the cover 132 of the host device, the smudge may redirect some of the light reflected by the external object toward the spurious-reflection detection pixel(s) 126 such that they sense a significantly higher optical intensity. For example, the spurious-reflection detection pixel 126 can be positioned on the sensor 108 a sufficient lateral distance (d) from the demodulation detection pixels 124 such that, in the absence of a smudge on cover 132 of the host device, the spurious-reflection detection pixel 126 senses, at most, only a relatively low optical intensity of light reflected by an object in a scene outside the module 100. On the other hand, a smudge 130 on the surface of the cover 132 of the host device can cause some of the light reflected by the external object to be redirected toward the spurious-reflection detection pixel 126 such that it senses a significantly higher optical intensity.

Figure 2:
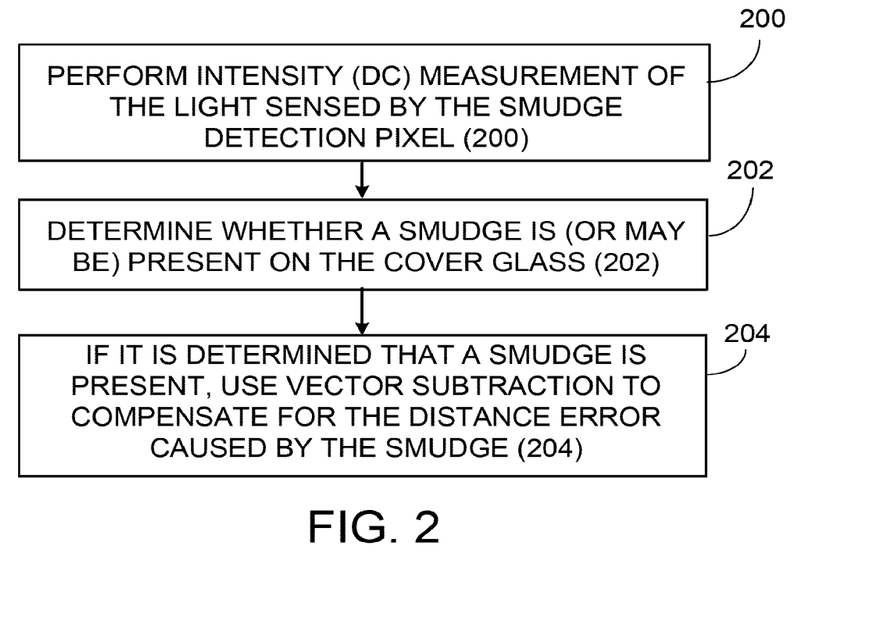
FIG. 2 is a flow chart showing a method of compensating for spurious reflections.

The optical intensity sensed by the spurious-reflection detection pixel 126 can be used by the sensor's processing circuitry to determine whether a smudge is present on the cover glass 132 and to determine how much light (i.e., amplitude and phase) collected by the active pixels 124 is due to the smudge rather than the object of interest. For example, as illustrated by FIG. 2, during each TOF frame, the sensor's control circuitry can initiate an intensity (DC) measurement of the light sensed by the spurious-reflection detection pixel 126 (block 200). Based at least in part on the output of the spurious-reflection detection pixel, the sensor's processing circuitry then can determine whether a smudge is present on the cover glass 132 (block 202). In particular, in some implementations, a high intensity sensed by the spurious-reflection detection pixel 126 in combination with a TOF sensor output of about zero (i.e., cover glass level) indicates the presence of an object on the surface of the cover glass 132. On the other hand, a high intensity sensed by the spurious-reflection detection pixel 126 in combination with a TOF measurement greater than zero indicates the presence of a smudge. Further, the intensity sensed by the spurious-reflection detection pixel 126 is proportional to the magnitude of the smudge vector. As the phase of the smudge vector is available to the sensor's processing circuitry, the processing circuitry can use vector subtraction to compensate for the distance error caused by the smudge (block 204). For example, the intensity of the light reflected by the smudge 130 can be measured by the spurious reflection pixel 126. Assuming that the path length to the smudge 130 is known to the sensor's processing circuitry, the phase also can be determined (e.g., as part of a calibration process). If the magnitude of the light on the spurious-reflection detection pixel 126 is known, the magnitude of the light component incident on the active pixels 124 that is a result of reflection from the smudge 130 can be inferred by the sensor's processing circuitry. The phase of the light component that is a result of the reflection from the smudge 130 can be factored out of the measured signals obtained from the active pixels 124.

Figure 3:
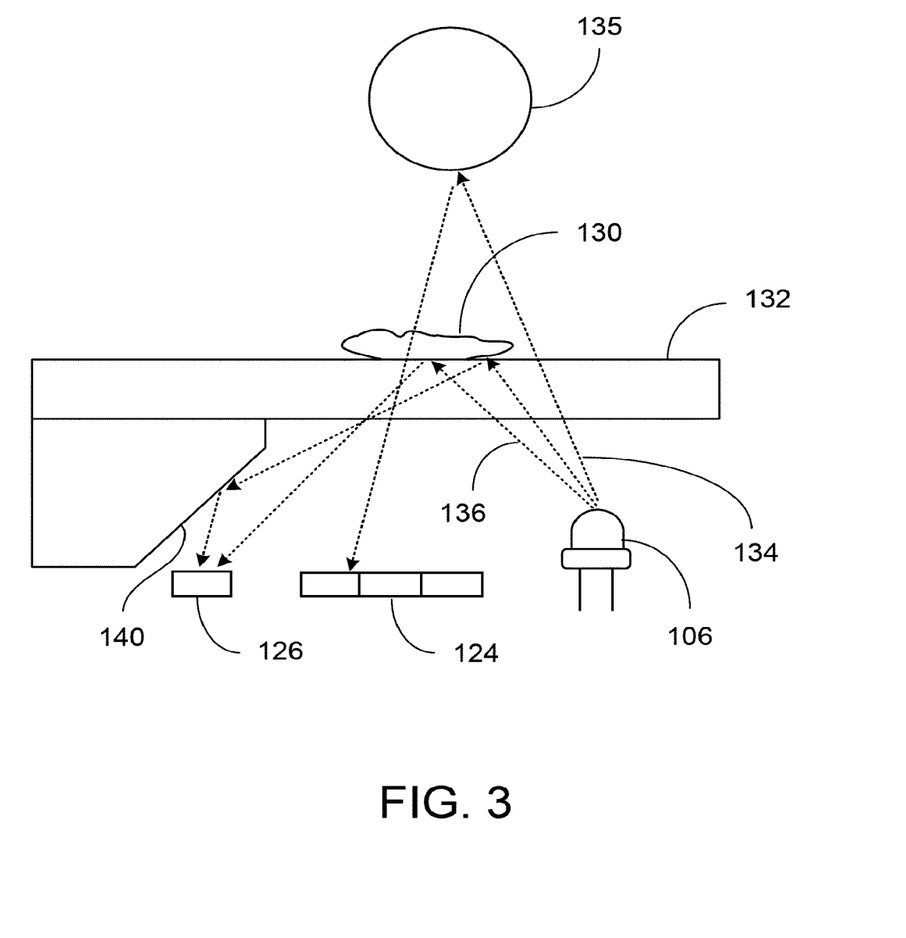
FIG. 3 is another example of a TOF sensor module.

In some implementations, as indicated by FIG. 3, the optoelectronic module includes a reflector 140 to direct light reflected by a smudge 130 toward the spurious-reflection detection pixel(s) 126. The reflector 140 can be positioned, for example, in the vicinity of the spurious-reflection detection pixel 126 just below the transmissive cover 132 of the host device. The presence of the reflector 140 can enhance sensing by the spurious-reflection detection pixel 126 by controlling the specific reflection angles at which reflected light is detected. Thus, in the absence of a smudge 130, light 134 from the emitter 106 can reach an object 135 outside the module and can be reflected by the object 135 for sensing by the demodulation detection pixels 124. The presence of a smudge 130 can cause some of the emitter light 136 to be reflected back into the module. The reflector 130 can redirect some of that reflected light toward the spurious-reflection detection pixel 126. The sensor's processing circuitry can use the change (i.e., increase) in intensity sensed by the spurious-reflection detection pixel 126 to determine that there is a smudge 130 on the transmissive cover 132 and/or to compensate for a distance error caused by the smudge.

Figure 4:
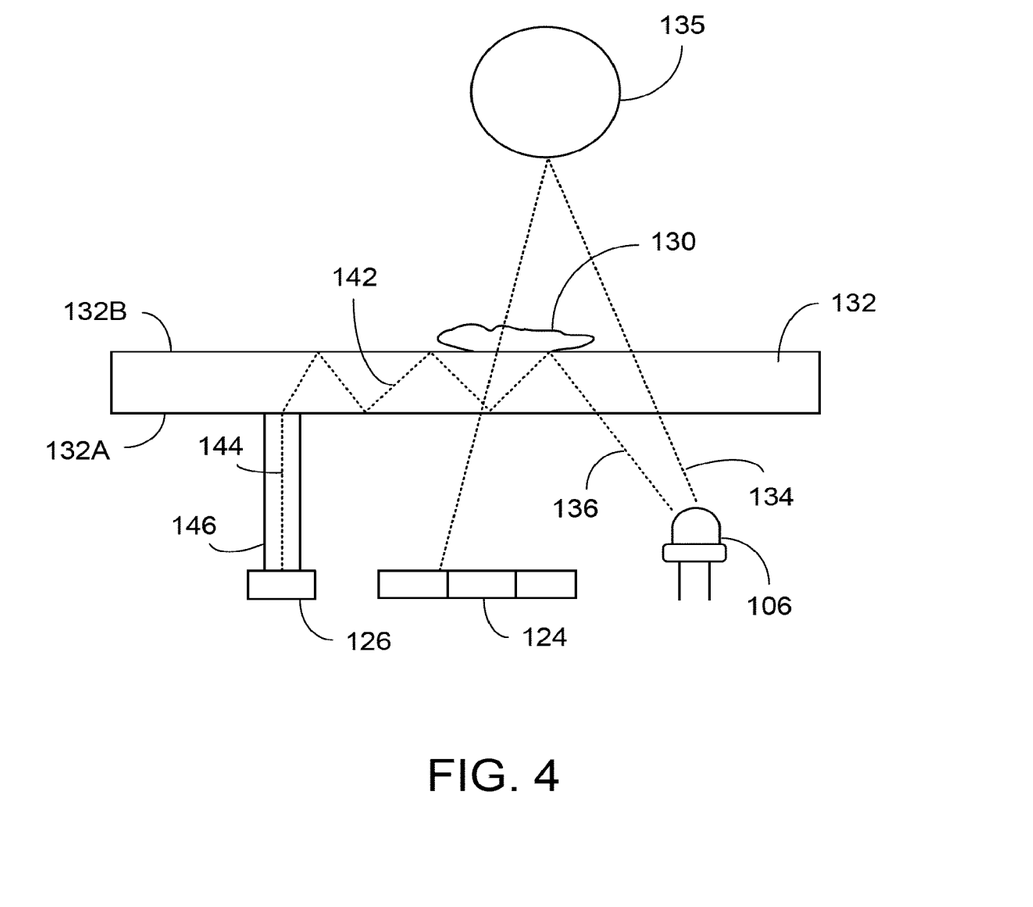
FIG. 4 is yet another example of a TOF sensor module.

In some cases, emitter light reflected by a smudge 130 on the transmissive cover 132 results in multiple internal reflections 142 off opposing inner surfaces 132A, 132B of the cover as shown in FIG. 4. Such light 142 may be reflected, for example, by internal reflection within the transmissive cover 132. Some of the reflected light 142, however, will pass, for example, through the sensor-side surface 132A of the cover 132. This light 144 can be directed to the spurious-reflection detection pixel(s) 126 by a light guide 146 coupled between the surface 132A and the pixel 126. Thus, in the absence of a smudge 130, light 134 from the emitter 106 can reach an object 135 outside the module and can be reflected by the object 135 for sensing by the demodulation detection pixels 124. The presence of a smudge 130 can cause some of the emitter light 136, 142 to be reflected back into the module. The light guide 146 can guide such light 144 to the spurious-reflection detection pixel 126. The sensor's processing circuitry can use the change (i.e., increase) in intensity sensed by the spurious-reflection detection pixel 126 to determine that there is a smudge 130 on the transmissive cover 132 and/or to compensate for a distance error caused by the smudge.

Figure 5:
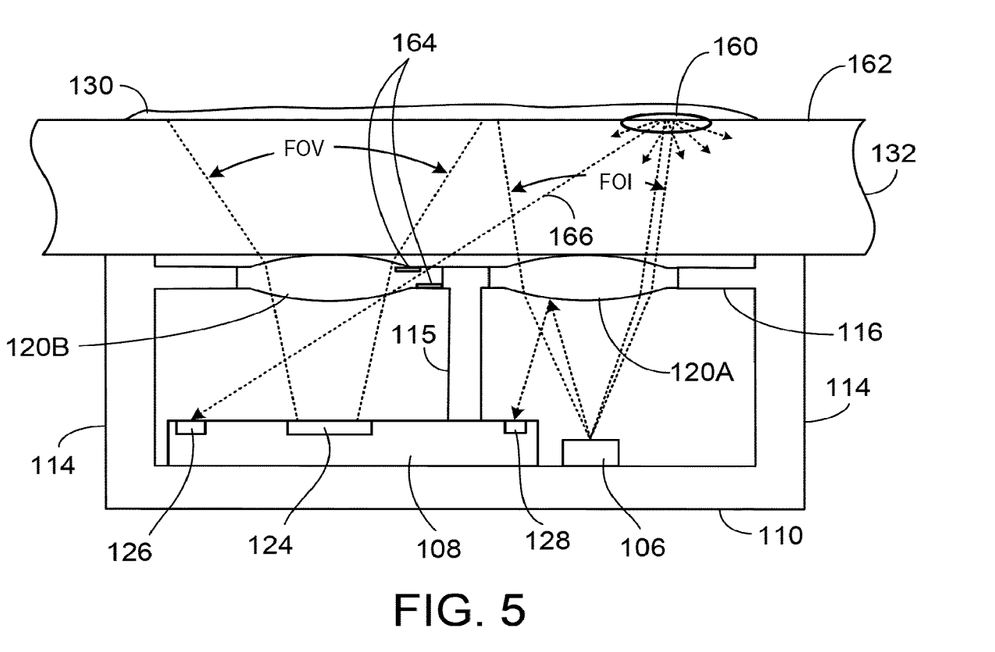
FIG. 5 illustrates a further example of a TOF sensor module.

FIG. 5 illustrates another implementation of an optoelectronic module that can facilitate enhanced detection of a smudge 130, for example, on the cover glass 132 of the host device. In this example, a smudge detection area 160 is defined on the object-side (i.e., exterior) surface 162 of the cover glass 132. The pre-specified smudge detection area 160 lies, for example, near the edge of the field of illumination (FOI) of the light emitter 106 (e.g., a VCSEL), outside the field of view (FOV) of the TOF's demodulation detection pixels 124. As further illustrated in FIG. 5, one or more light absorbing regions 164 are provided in or on the material of the detection channel passive optical element 120B so as to leave only a relatively narrow straight path 166 from the smudge detection area 160 of the cover glass 132 to the spurious-reflection detection pixel(s) 126. The light absorbing regions are substantially non-transparent (i.e., opaque) to light at a wavelength emitted by the light emitter Although the example of FIG. 5 shows two such light absorbing regions 164, other implementations may include only a single light absorbing region, whereas some implementations may have more than two light absorbing regions in the material of the detection channel passive optical element 120B. If the light emitter 106 emits, for example, light in the infra-red (IR) range, each light absorbing region 164 can be formed as an IR-absorbing region, for example, by laser blackening specified regions of the passive optical element 120B or by depositing a thin coating of black chrome on the specified areas of the passive optical element 120B.

Figure 6:
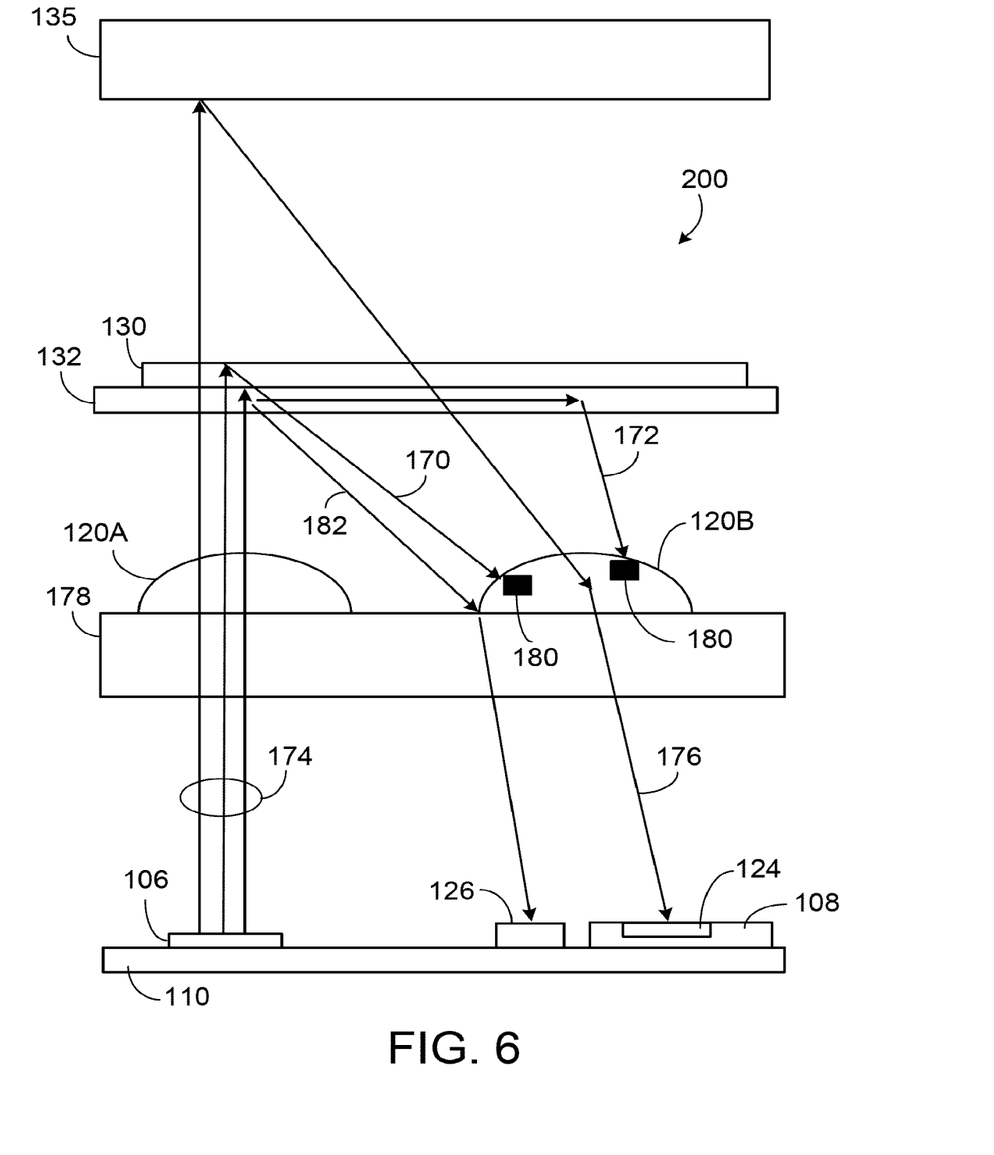
FIG. 6 illustrates an example of a TOF sensor module.

FIG. 6 illustrates an optoelectronic module 200 that can help block at least some light 170 reflected by a smudge 130 on the cover glass 132 of the host device, or light 172 reflected by the cover glass itself, and prevent the reflected light from impinging on the demodulation detection pixels 124. The module 200 includes a passive optical element (e.g., a lens) 120A that intersects the optical emission path 174, and a passive optical element 120B (e.g., a lens) that intersects the optical detection path 176. In the illustrated example, both passive optical elements 120A, 120B rest on the surface of a transparent substrate 178. In other implementations, the passive optical elements 120A, 120B may be part of an optics member as shown, for example, in FIG. 1.

As further illustrated in FIG. 6, the passive optical element 120B for the detection channel includes one or more light absorbing regions 180 that absorb light at the wavelength(s) emitted by the emitter 106. In some instances, each light absorbing region 180 is formed as an IR-absorbing region, for example, by laser blackening specified regions of the passive optical element 120B or by depositing a thin coating of black chrome on specified areas of the passive optical element 120B. The light absorbing regions 180 can be positioned on the passive optical element 120B so as to intersect, and effectively block, light 170 reflected by the smudge and/or light 172 reflected by the cover glass 132 that otherwise would impinge on the demodulation detection pixels 124. On the other hand, the passive optical element 120B can direct some parts 182 of the light reflected by the smudge 130 toward the spurious-reflection detection pixels 126. Likewise, light reflected by an object 135 in a scene outside the module 200 can be reflected along paths (e.g., path 176) that pass through the passive optical element 120B and impinge on the demodulation detection pixels 124.

Figure 7:
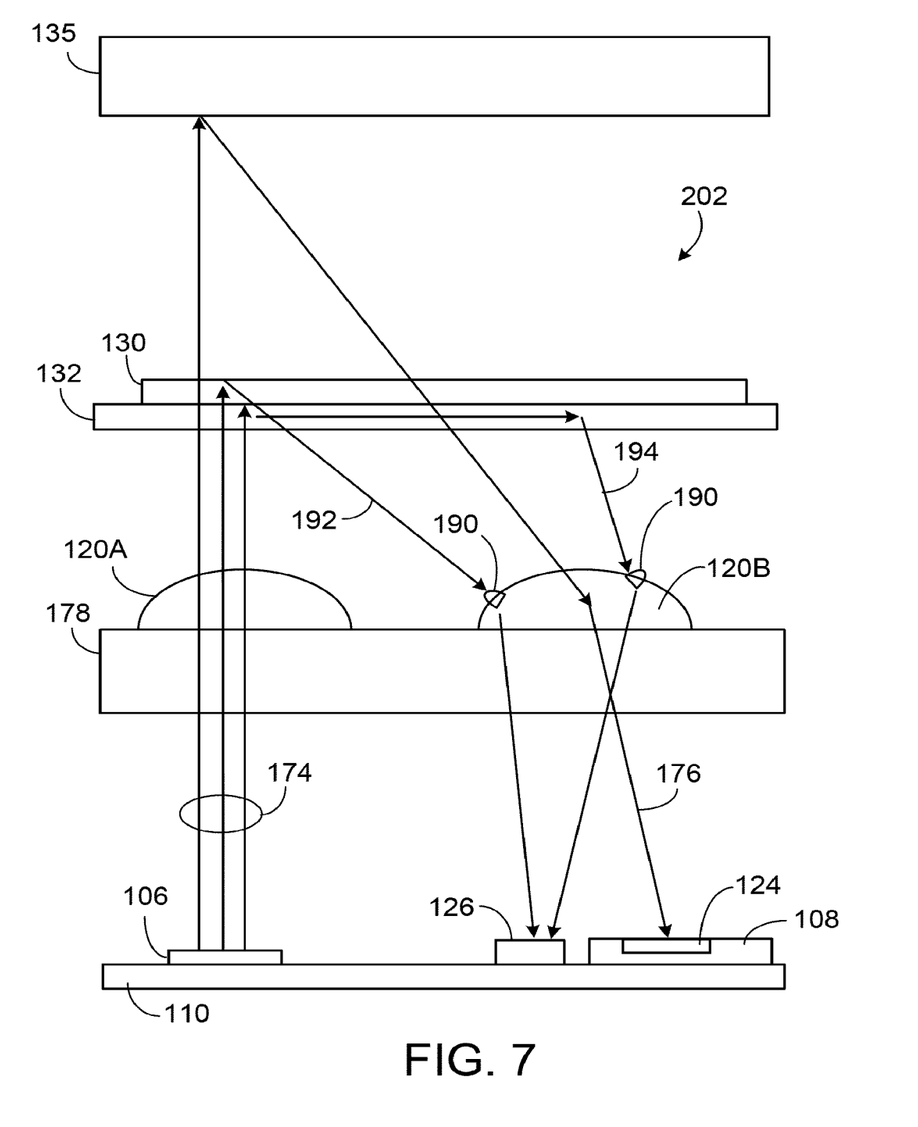
FIG. 7 illustrates another example of a TOF sensor module.

FIG. 7 illustrates an optoelectronic module 202 that includes one or more light redirecting elements 190 that can redirect some of the light 192, 194 impinging on the detection channel's passive optical element 120B toward the spurious-reflection detection pixels 126 and away from the sensor 108 (i.e., away from the demodulation detection pixels 124). In particular, as shown in FIG. 7, the surface of the optical element 120B for the detection channel can have one or more light redirecting elements 190, such as refractive or diffractive lenses, that redirect the light 192, 194 toward the spurious-reflection detection pixels 126. In some implementations, the light redirecting elements 190 are integrated within the optical element 120B. The light redirecting elements 190 can be positioned on the passive optical element 120B so as to intersect light 192 reflected by the smudge and/or light 194 reflected by the cover glass 132 that otherwise might impinge on the demodulation detection pixels 124. On the other hand, light reflected by an object 135 in a scene outside the module 200 can be reflected along paths (e.g., path 176) that pass through the passive optical element 120B and impinge on the sensor's demodulation detection pixels 124.

Figure 8:
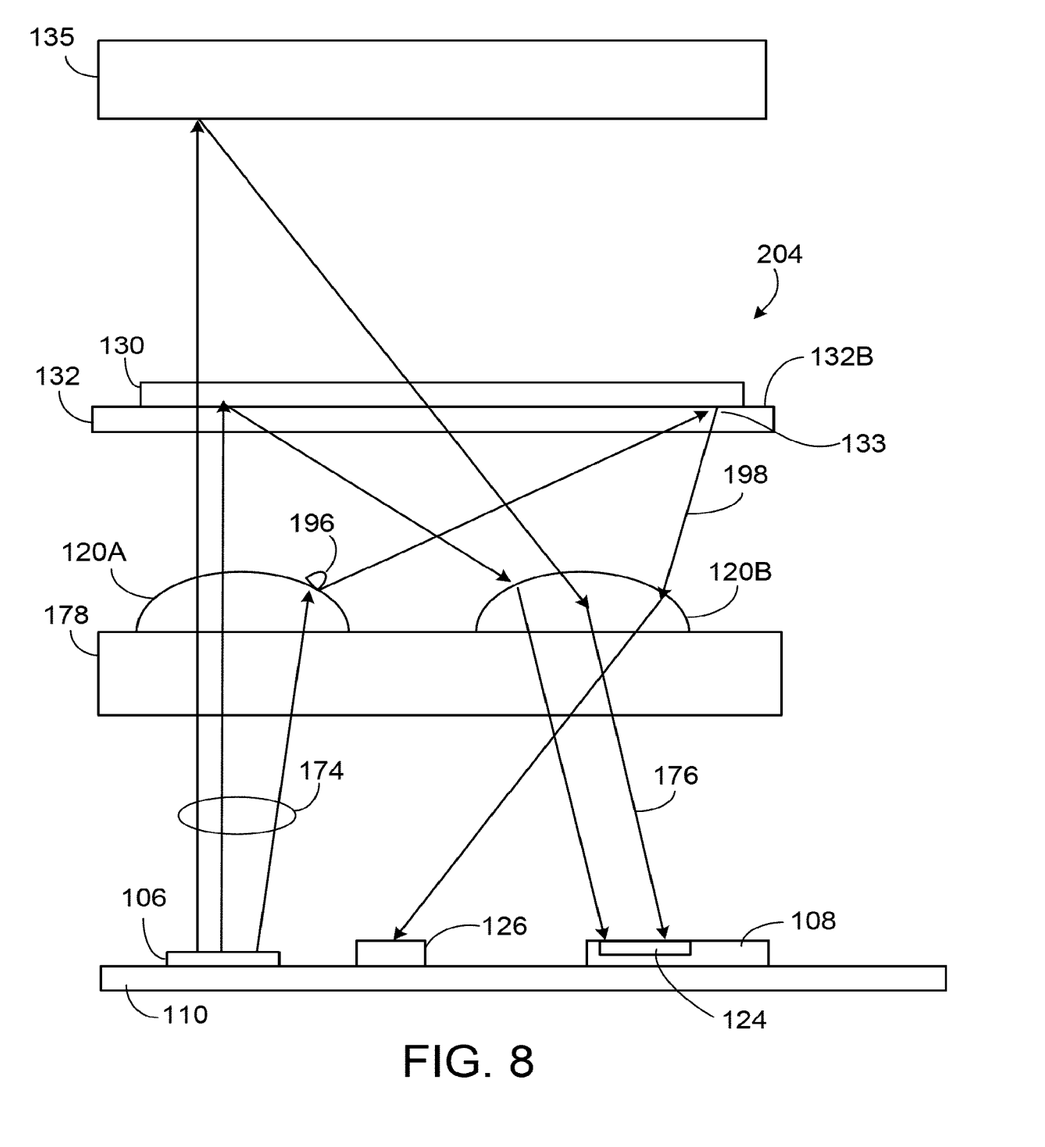
FIG. 8 illustrates a further example of a TOF sensor module.

FIG. 8 illustrates another optoelectronic module 204 in which the emitter channel's passive optical element 120A has one or more light redirecting elements 196 that can redirect some of the emitter light 174 toward a particular region 133 on the outer surface 132B of the cover glass 132. Each light redirecting element 196 can be, for example, a passive optical element such as a refractive or diffractive element. In some implementations, the light directing elements 190 are integrated within the optical element 120B. If a smudge 130 is present on the surface 132B of the cover glass 132, light 198 reflected by the smudge 130 at the particular region 133 of the cover glass surface passes through the passive optical element 120B, which directs the light 198 toward the spurious-reflection detection pixels 126. Preferably, the spurious-reflection detection pixel(s) 126 are located at a sufficiently large lateral distance from the sensor 108 such that the light incident on the spurious-reflection detection pixel(s) 126 is based only (or at least primarily) on light reflected by the smudge 130 and not light reflected by the object 135. The detection channel's passive optical element 120B should be designed to direct the light 198 from the smudge 130 at the proper angle so that the light 198 impinges on the spurious-reflection detection pixel(s) 126.

Figure 9:
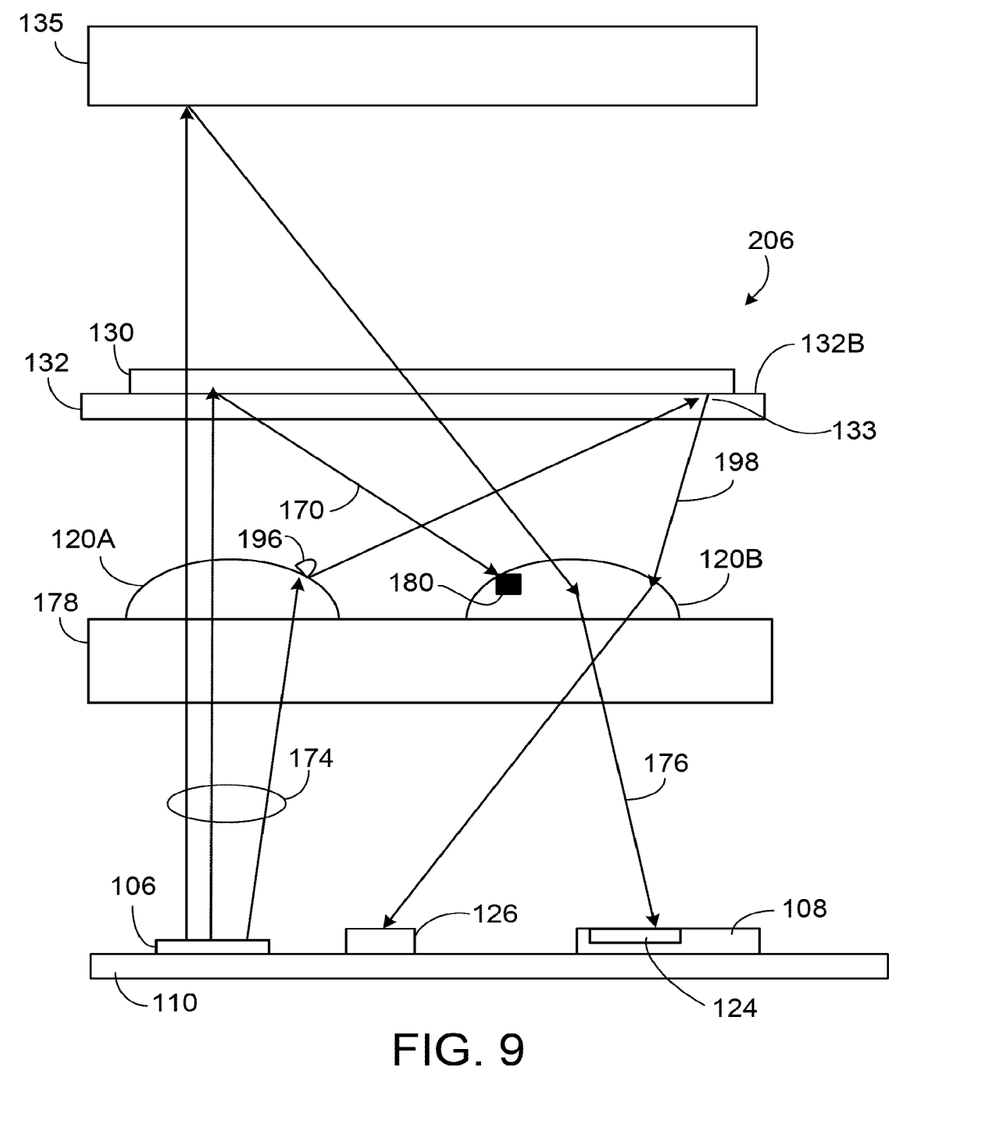
FIG. 9 illustrates yet another example of a TOF sensor module.

In some instances, one or more of the features described in the foregoing examples may be combined in a single module. FIG. 9 illustrates one such example of a module 206 in which the emitter channel optical element 120A includes a light directing element 196 as described in connection with FIG. 8 and the detection channel optical element 120B includes a light absorbing region 180 as described in connection with FIG. 7. Modules including other combinations of the various features described in this disclosure can be provided to improve the modules' ability to distinguish between signals indicative of reflections from an object interest and signals indicative of a spurious reflections.

Figure 10:
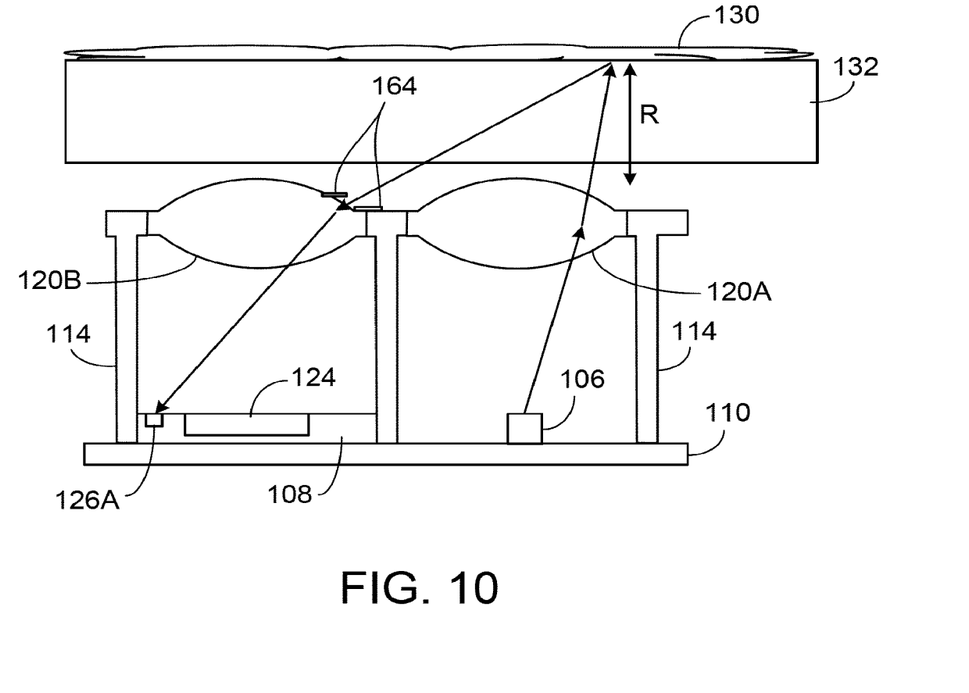
FIG. 10 illustrates a further example of a TOF sensor module.

As described above, the modules can include one or more dedicated spurious-reflection detection pixels 126 that are separate from the demodulation detection pixels 124. As also described, the modules also may include one or more dedicated reference pixels 128 that can be used to compensate for thermal drift and/or to provide a zero distance measurement (see, e.g., FIG. 1). In some implementations, however, the module can include pixels that serve as combined reference and spurious-reflection detection pixels. An example is illustrated in FIG. 10, which includes one or more pixels 126A whose output can be used by the sensor's processing circuitry to correct for spurious reflections such as from a smudge and also to compensate for thermal drift/or and to provide a zero distance measurement. For example, signals from the pixels 126A can be used to determine both amplitude and phase during calibration of the module. During subsequent operation, changes in amplitude of the detected signals of the pixels 126A can indicate the presence of the smudge and can be used to correct for spurious reflections caused by the smudge. Likewise, phase shifts in the detected signals of the pixels 126A can be used to compensate for thermal drift.

In some implementations, instead of, or in addition to, dedicated smudge pixels, signals obtained from the demodulation detection pixels 124 can be used to determine the wave component (i.e., amplitude, phase) that is caused by reflection from a smudge 130 on the surface of the cover glass 132. To do so, the wave component caused by the smudge reflection can be estimated, for example, by repeating measurements at two different modulation frequencies. Assuming the distance between the smudge 130 and the emitter 106 is known to the module's processing circuitry (e.g., based on a previously stored value in memory and/or calibration of the module), the additional wave component resulting from the presence of the smudge 130 can be determined by the processing circuitry. Any such additional wave component would be common to signals detected by the demodulation detection pixels 124 at both modulation frequencies. The additional wave component caused by the smudge 130 can be eliminated (i.e., subtracted out) through known vector manipulation techniques, and the wave components resulting from light reflected by the object of interest outside the module can be calculated. The resulting phase shift then can be used to calculate the distance to the object 135.

Figure 11:
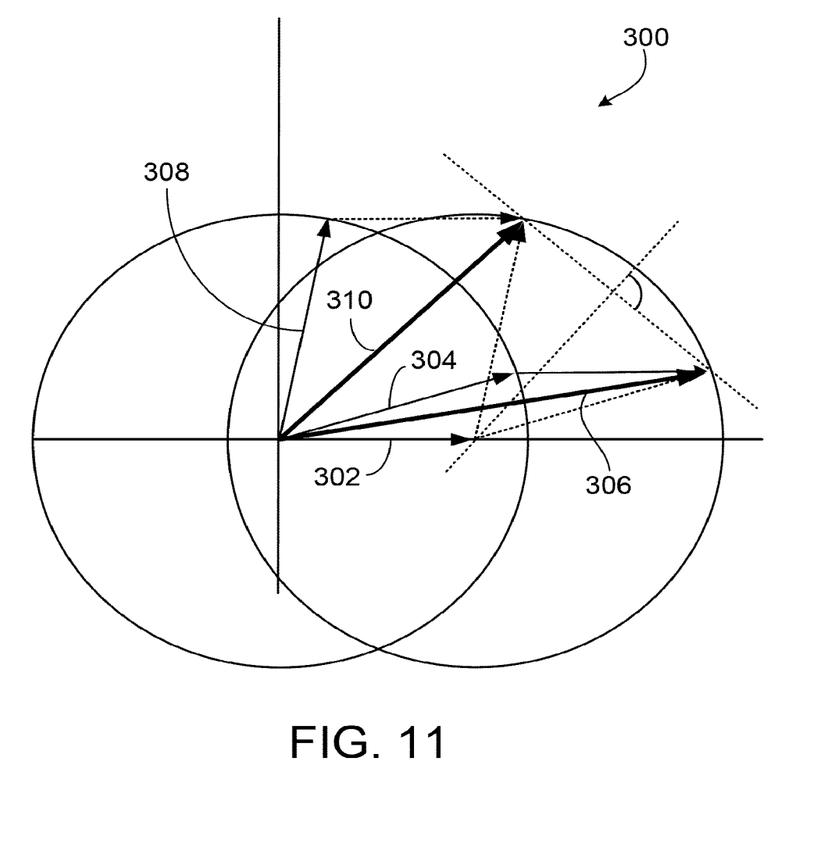
FIG. 11 is an example of a phasor diagram based on TOF measurements using two different modulation frequencies.

FIG. 11 is an example of a phasor diagram 300 illustrating the various light components in which two different modulation frequencies are used as described above. In FIG. 11, 302 is the wave component (i.e., vector representing amplitude, phase) caused by reflection from the smudge, 304 is the wave component caused by light reflected from the object at the low modulation frequency, 306 is the wave component that represents the sum of the light reflected both by the object and by the smudge at the low modulation frequency, 308 is the wave component caused by light reflected from the object at the high modulation frequency, and 310 is the wave component that represents the sum of the light reflected both by the object and by the smudge at the high modulation frequency. The wave components (i.e., phasors) 302, 304, 306, 308, and 310 in FIG. 11 are rotated by a phase corresponding to the known distance of the smudge measured at the respective modulation frequency. In the phasor diagram 300, the two phasors 306, 310 (representing the received light signal at low and high demodulation frequencies, respectively) lie on a circle whose center corresponds to the amplitude of the smudge component. Thus, vector manipulation can be used to eliminate the wave component caused by the smudge.

In some implementations, it can be advantageous to increase the difference between the applied modulation frequencies. Further, it some cases, the lower frequency can be replaced by two DC measurements (i.e., switching the illumination on and off, respectively).

As previously described, the foregoing modules and techniques can be applicable to correction of errors caused by spurious reflections resulting from reflections from the cover glass, from a filter, or from other optical/non-optical components in the optoelectronic module or host device.

The modules described here can be integrated advantageously into devices such as smart phones, tablets, and other host devices in which space is at a premium.

Various modifications can be made to the foregoing examples. Further, features from the different examples can, in some instances, be integrated in the same module. Other implementations are within the scope of the claims.

What is claimed is:

1. An optoelectronic module comprising:
   a light emission chamber and a light detection chamber;
   a first passive optical element disposed over the light emission chamber and a second passive optical element disposed over the light detection chamber;
   a light emitter in the light emission chamber operable to emit light toward the first passive optical element;
   a plurality of demodulation pixels in the light detection chamber arranged to detect light from the emitter that is reflected by an object outside the module; one or more spurious-reflection detection pixels in the light detection chamber; and
   one or more light absorbing regions in or on the second passive optical element for defining a narrow straight path from a predefined area on a surface of a transmissive cover of a host device to the one or more spurious-reflection detection pixels, wherein the one or more light absorbing regions are substantially non-transparent to light at a wavelength emitted by the light emitter.

2. The optoelectronic module of claim 1 including a plurality of the light absorbing regions in or on the second passive optical element.

3. The optoelectronic module of claim 2 wherein a first one of the light absorbing regions is on a surface of the second passive optical element facing the demodulation pixels, and a second one of the light absorbing regions is on a surface of the second passive optical element facing away the demodulation pixels.

4. The optoelectronic module of claim 1 wherein the light emitter is operable to emit infra-red light and wherein the one or more light absorbing regions are substantially non-transparent to the infra-red light.

5. The optoelectronic module of claim 1 wherein each of the one or more light absorbing regions comprises a black chrome coating.

6. The optoelectronic module of claim 1 wherein each of the one or more light absorbing regions is a laser blackened region of the second passive optical element.

7. An optoelectronic module comprising:
   a light emission chamber and a light detection chamber;
   a first passive optical element disposed over the light emission chamber and a second passive optical element disposed over the light detection chamber;
   a light emitter in the light emission chamber operable to emit light toward the first passive optical element;
   a plurality of demodulation pixels in the light detection chamber arranged to detect light from the emitter that is reflected by an object outside the module;
   one or more spurious-reflection detection pixels in the light detection chamber; and
   one or more light absorbing regions in or on the second passive optical element arranged to block emitter light reflected from one or more pre-defined areas of a transmissive cover of a host device from reaching the demodulation pixels.

8. The optoelectronic module of claim 7 wherein the one or more light absorbing regions are disposed so as to allow emitter light reflected by an object outside the module back toward the module to pass through the second passive optical element to the demodulation pixels.

9. The optoelectronic module of claim 7 wherein each of the one or more light absorbing regions comprises a black chrome coating.

10. The optoelectronic module of claim 7 wherein each of the one or more light absorbing regions is a laser blackened region of the second passive optical element.

\* \* \* \* \*